United States Patent
Higuchi et al.

(10) Patent No.: US 8,079,616 B2
(45) Date of Patent: Dec. 20, 2011

(54) SEATBELT APPARATUS

(75) Inventors: Masahiro Higuchi, Tokyo (JP); Yasuo Itoga, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 12/662,565

(22) Filed: Apr. 23, 2010

(65) Prior Publication Data

US 2010/0276532 A1  Nov. 4, 2010

Related U.S. Application Data

(62) Division of application No. 11/396,636, filed on Apr. 4, 2006, now abandoned.

(30) Foreign Application Priority Data

Apr. 7, 2005 (JP) ................... 2005-110462

(51) Int. Cl.
*B60R 22/36* (2006.01)
*B60R 22/46* (2006.01)
*B60R 22/42* (2006.01)

(52) U.S. Cl. ............................ 280/806; 280/808; 24/170

(58) Field of Classification Search .................... 24/170, 24/191, 193, 265 BC, 197; 280/806, 808, 280/801.1
See application file for complete search history.

(56) References Cited

U.S. PATENT DOCUMENTS

| | | | |
|---|---|---|---|
| 5,100,176 A | 3/1992 | Ball et al. | |
| 5,138,749 A | 8/1992 | McCune et al. | |
| 5,548,874 A | 8/1996 | Mishina et al. | |
| 5,634,664 A | 6/1997 | Seki et al. | |
| 5,870,816 A | 2/1999 | McFalls et al. | |
| 7,325,280 B2 | 2/2008 | Ichida | |
| 2002/0149191 A1 | 10/2002 | Nishizawa | |
| 2004/0158955 A1 | 8/2004 | Acton et al. | |
| 2006/0138852 A1 | 6/2006 | Ichida | |

FOREIGN PATENT DOCUMENTS

| | | |
|---|---|---|
| CN | 1796193 A | 7/2006 |
| EP | 1 676 760 A1 | 7/2006 |
| JP | 2001-10443 | 1/2001 |
| JP | 2001-287622 | 10/2001 |
| JP | 2003-312439 | 11/2003 |

*Primary Examiner* — Ruth Ilan
(74) *Attorney, Agent, or Firm* — Foley & Lardner LLP

(57) ABSTRACT

A seatbelt apparatus is provided which can constrain a passenger by ensuring removal of a slack of a lap belt when two pretensioners are activated under two different time frames. A pretensioner of a seatbelt retractor is activated first, and a shoulder belt and a lap belt are pulled in a direction toward the seatbelt retractor. Subsequently, a pretensioner of a belt anchor portion is activated and pulls a seatbelt toward the belt anchor portion, and hence a one-way tongue catches and locks the seatbelt. Accordingly, the shoulder belt is prevented from moving toward the lap belt through the tongue. Therefore, removal of the slack of the lap belt is ensured, and hence a lumber of the passenger is firmly fixed.

4 Claims, 10 Drawing Sheets

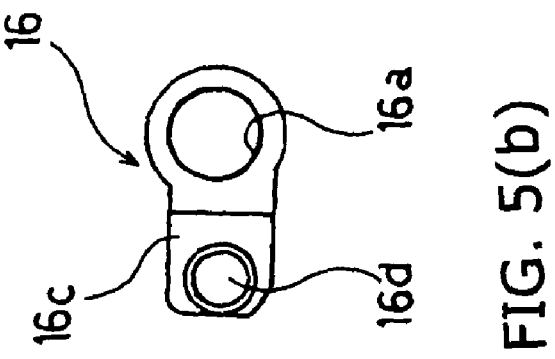
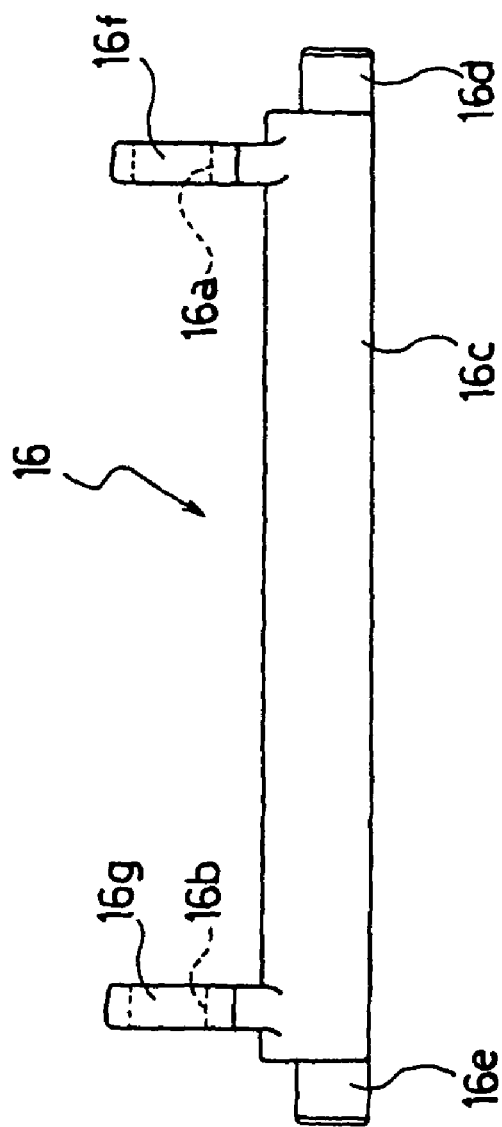
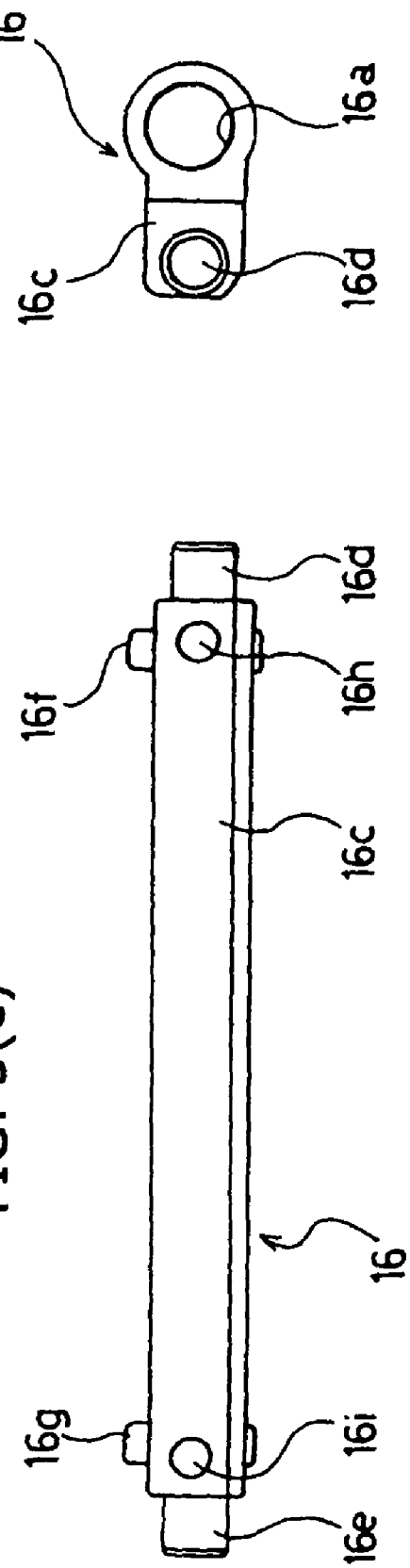
FIG. 5(b)
FIG. 5(c)
FIG. 5(a)

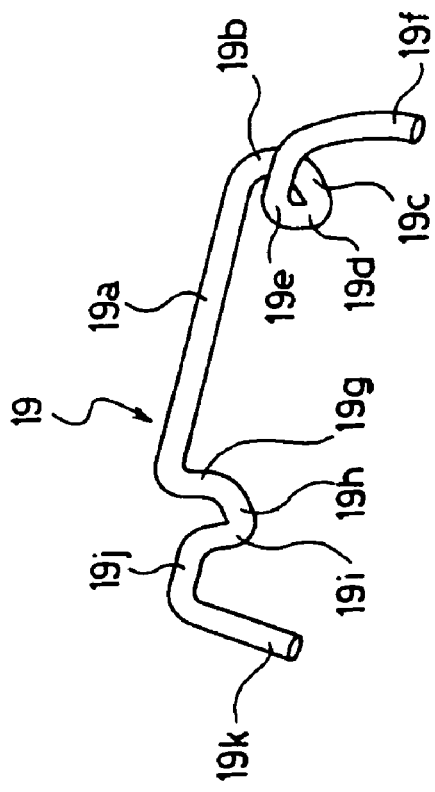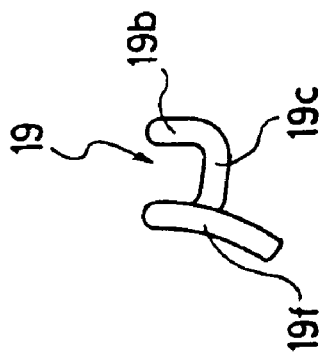
FIG. 6(d)
FIG. 6(b)
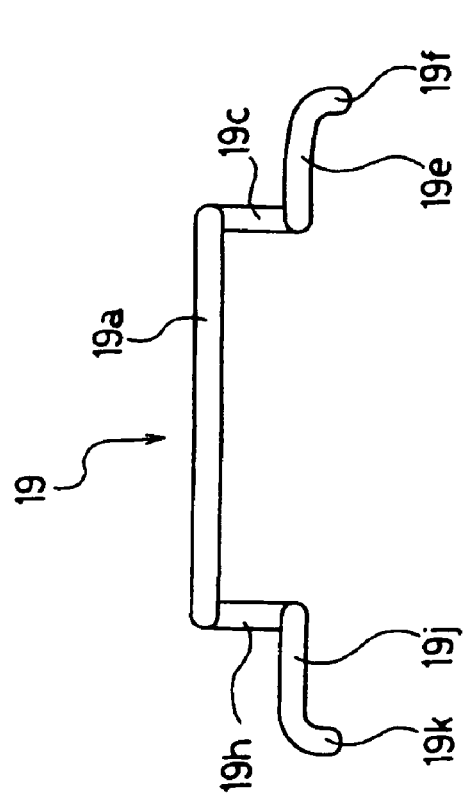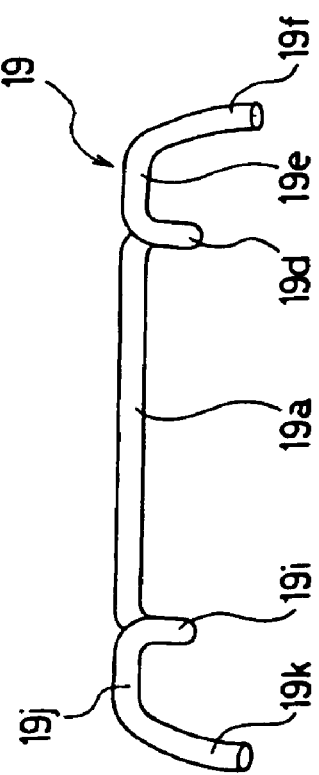
FIG. 6(c)
FIG. 6(a)

SEATBELT APPARATUS

CROSS-REFERENCE TO RELATED PATENT APPLICATIONS

This application is a Divisional of U.S. patent application Ser. No. 11/396,636, filed Apr. 4, 2006.

BACKGROUND

The present invention relates to a seatbelt apparatus mounted on a vehicle such as an automotive vehicle for constraining and protecting a passenger by a seatbelt and to a seatbelt apparatus provided with two pretensioners.

A seatbelt apparatus provided on a vehicle seat of the automotive vehicle or the like prevents the passenger from jumping out from the seat of the passenger by constraining the passenger with the seatbelt in case of emergency such as vehicle collision where a significant deceleration is applied to the vehicle, thereby protecting the passenger.

In the related art, as one of the seatbelt apparatus in the related art, for example, there is a three-point type seatbelt apparatus as shown in FIG. 9. In the drawing, reference numeral 1 designates a seatbelt apparatus provided on a vehicle seat 2, reference numeral 3 designates a seatbelt retractor fixed to a vehicle body near the vehicle seat 2 for constantly urging a seatbelt 4 so as to be withdrawably retracted, and locking the seatbelt 4 from being withdrawn in case of emergency, reference numeral 5 designates a tongue slidably supported by the seatbelt 4, reference numeral 6 designates a buckle located on the side of the vehicle seat 2 and fixed to the vehicle seat 2 or the vehicle body for being engaged by the tongue 5, and reference numeral 7 designates a belt guide mounted to an upper side of a vehicle side portion such as a center pillar 8 for guiding the seatbelt 4 withdrawn from the seatbelt retractor 3. A belt anchor portion 4a at a distal end of the seatbelt 4 withdrawn from the seatbelt retractor 3 is fixed to the vehicle seat 2 or the vehicle body.

With the seatbelt apparatus 1 configured as described above, when the passenger attaches the seatbelt 4, the passenger sits on the vehicle seat 2, withdraws the seatbelt 4 from the seatbelt retractor 3, engages the tongue 5 with the buckle 6, and then releases his/her hand from the tongue 5, whereby the part of the seatbelt 4 excessively withdrawn is retracted by the seatbelt retractor 3 and hence a slack of the seatbelt is removed, and the seatbelt 4 is attached to the passenger. In this case, the seatbelt 4 between the belt guide 7 and the tongue 5 functions as a shoulder belt 4b for constraining the shoulder and the chest of the passenger, and the seatbelt 4 between the belt anchor portion 4a fixed to the vehicle body and the tongue 5 functions as a lap belt 4c for constraining a lap ("lumber") of the passenger.

Then, in case of emergency such as the vehicle collision of where a significantly large deceleration is applied to the vehicle, an emergency locking mechanism of the seatbelt retractor 3 is activated to lock the seatbelt 4 from being withdrawn and prevent the forward movement of the passenger by a force of inertia, whereby the passenger is constrained and protected. In particular, in the recent years, the pretensioner is provided in the seatbelt retractor 3, the belt anchor portion 4a, or the buckle or the like so that the pretensioner is activated in case of occurrence of emergency and pulls the seatbelt 4 to remove the slack of the seatbelt 4 quickly so that the forward movement of the passenger is kept as little as possible, whereby the effects of constraining and protecting the passenger are improved.

In the seatbelt apparatus provided with the pretensioner as described above, there is a seatbelt apparatus in which the pretensioners are provided in the seatbelt retractor and the belt anchor portion respectively, so that the pretensioner in the seatbelt retractor is activated first in case of emergency to retract the seatbelt by the seatbelt retractor, and then the pretensioner of the belt anchor portion is activated to pull the seatbelt and remove the slack of the seatbelt quickly for constraining the passenger (for example, see Japanese Unexamined Patent Application Publication No. 2001-287622).

In the seatbelt apparatus disclosed in Japanese Unexamined Patent Application Publication No: 2001-287622, since the two pretensioners are activated under two time frames, even when the slack of the seatbelt cannot be sufficiently removed by the first pretensioner, the slack of the seatbelt can be removed by the second pretensioner, whereby constraint of the passenger is ensured.

However, in the seatbelt apparatus disclosed in Japanese Unexamined Patent Application Publication No. 2001-287622, when a first pretensioner 9 of the seatbelt retractor 3 is activated and the seatbelt 4 is retracted by the seatbelt retractor 3 as shown in FIG. 10($a$), both of the shoulder belt 4$b$ and the lap belt 4$c$ are pulled toward the seatbelt retractor 3 as indicated by an arrow A.

Subsequently, a second pretensioner 10 of the belt anchor portion 4$a$ is activated and hence the seatbelt 4 is pulled toward the belt anchor portion 4$a$ as shown in FIG. 10($b$), both of the lap belt 4$c$ and the shoulder belt 4$b$ are pulled toward the belt anchor portion 4$a$ as indicated by an arrow B. Therefore, even though the lap belt 4$c$ is pulled by the first pretensioner 9 and a slack of the lap belt 4$c$ is removed, the shoulder belt 4$b$ is pulled with the lap belt 4$c$ in the opposite direction by the second pretensioner 10, and hence the lap belt 4$c$ is loosened. Therefore, since the lap belt 4$c$ which functions for constraining the passenger most is loosened, the effect of constraining the passenger cannot be sufficiently achieved.

Therefore, there remains a need to provide a seatbelt apparatus in which removal of the slack of the lap belt is ensured even though the two pretensioners are activated under two time frames, whereby the effects of constraining the passenger are satisfactorily achieved.

SUMMARY

According to one embodiment of the invention, a seatbelt apparatus includes a seatbelt including a shoulder belt for constraining an upper half body of a passenger and a lap belt for constraining a lumber of the passenger, a seatbelt retractor for withdrawably retracting the seatbelt and locking the seatbelt from being retracted in case of emergency, a belt anchor portion for fixing a distal end of the seatbelt withdrawn from the seatbelt retractor to a vehicle body, a tongue slidably supported by the seatbelt and partitioning between the shoulder belt and the lap belt, a buckle fixed to the vehicle body and capable of being engaged by the tongue, a first and a second pretensioner, wherein each may be provided in at least two devices selected from the seatbelt retractor, the belt anchor portion and the buckle, wherein the first and second pretensioners are activated to pull the seatbelt in case of emergency, the first and second pretensioners being adapted to be activated under two time frames in such a manner that the second pretensioner is activated after having activated the first pretensioner, and a belt one-way movement preventing mechanism for preventing the shoulder belt from moving toward the lap belt when the second pretensioner is activated.

According to another embodiment, a seatbelt apparatus is configured so that the tongue is a one-way tongue which prevents the shoulder belt from moving toward the lap belt when a predetermined pulling force toward the shoulder belt is applied to the seatbelt and, in this state, a force larger than the predetermined pulling force is applied to the seatbelt in the direction toward the lap belt, and the belt one-way movement preventing mechanism is the one-way tongue.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIGS. 3(a)-3(c) show a tongue plate in the example in FIG. 2, in which FIG. 3(a) is a front view, FIG. 3(b) is a right side view, and FIG. 3(c) is a top view according to one embodiment.

FIGS. 4(a)-(c) show a webbing guide in the example in FIG. 2, in which FIG. 4(a) is a front view, FIG. 4(b) is a right side view, and FIG. 4(c) is a bottom view according to one embodiment.

FIGS. 5(a)-5(c) show a lock bar in the example in FIG. 2, in which FIG. 5(a) is a front view, FIG. 5(b) is a right side view, and FIG. 5(c) is a top view according to one embodiment.

FIGS. 6(a)-6(d) show a bar spring in the example in FIG. 2, in which FIG. 6(a) is a front view, FIG. 6(b) is a right side view, FIG. 6(c) is a top view, and FIG. 6(d) is a perspective view according to one embodiment.

FIG. 8(a) is a cross-sectional view showing a state of the tongue in the stored position when a seatbelt is not attached; FIG. 8(b) is a cross-sectional view showing the state of the tongue when the seatbelt is attached and the pretensioner is activated; and FIG. 8(c) is a cross-sectional view showing the state of the tongue when the seatbelt is attached and after the pretensioner is activated.

FIGS. 10(a)-10(b) show an example of the seatbelt apparatus provided with pretensioners in the related art schematically, in which FIG. 10(a) is an explanatory drawing showing a state in which the pretensioner of a seatbelt retractor is activated, and FIG. 10(b) is an explanatory drawing showing a state in which the pretensioner in the belt anchor portion is activated.

DETAILED DESCRIPTION

Embodiments of the present invention will be described below with reference to the accompanying drawings. It should be understood that the following description is intended to describe exemplary embodiments of the invention, and not to limit the invention.

Figure 1B:
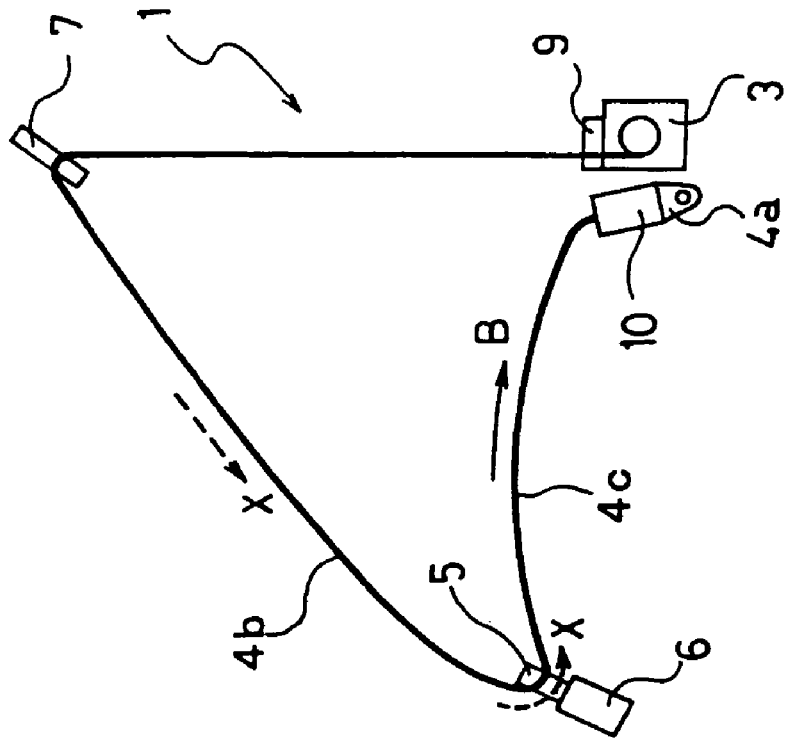
FIG. 1(b) is an explanatory drawing showing a state in which a pretensioner of a belt anchor portion is activated according to one embodiment.
Figure 1A:
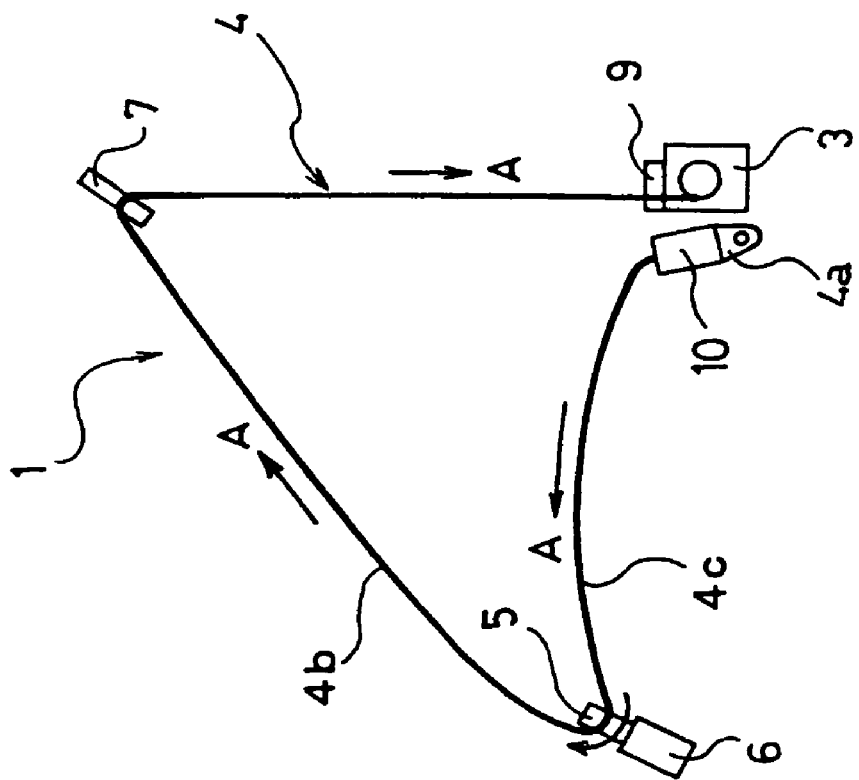
FIG. 1(a) is an explanatory drawing showing a state in which a pretensioner of a seatbelt retractor is activated according to one embodiment.

FIGS. 1(a)-1(b) are schematic drawings of a seatbelt apparatus according to one embodiment of the invention. FIG. 1(a) is an explanatory drawing showing a state in which a pretensioner of a seatbelt retractor is activated, and FIG. 1(b) is an explanatory drawing showing a state in which a pretensioner of a belt anchor portion is activated. The same parts as a seatbelt apparatus 1 in the related art described above shown in FIG. 9 and FIG. 10 are represented by the same reference numerals.

As shown in FIG. 1(a), the seatbelt apparatus 1 according to one embodiment of the invention is configured as the general three-point type seatbelt apparatus in the related art described above in such a manner that the a belt anchor portion 4a at one end of a seatbelt 4 for constraining a passenger is fixed to a vehicle body, and the other end of the seatbelt 4 is guided by a belt guide 7 mounted to an upper portion of the vehicle body such as a center pillar, and then withdrawably retracted by a seatbelt retractor 3 fixed to a lower portion of the vehicle body, and a tongue 5 slidably supported by the seatbelt 4 between the belt anchor portion 4a and the belt guide 7 is engaged with a buckle 6 fixed to the vehicle body or the like, whereby the passenger seated on a vehicle seat is constrained.

The tongue 5 used in the seatbelt apparatus 1 according to one embodiment of the invention is formed of a one-way tongue. This one-way tongue is adapted in such a manner that the tongue 5 allows free passage of the seatbelt 4 in either directions. When a predetermined pulling force toward the seatbelt retractor 3 is applied to a shoulder belt 4b and, in this state, a pulling force which is larger than the predetermined pulling force is applied to the lap belt 4c in the direction toward the belt anchor portion 4a, the one-way tongue catches and locks the seatbelt 4 to prevent the shoulder belt 4b from moving toward a lap belt 4c, and allow the lap belt 4c to move toward the shoulder belt 4b.

According to one embodiment of the invention, the seatbelt apparatus uses a tongue proposed in Japanese Patent Application No. 2004-375760 that the present applicant previously filed as a patent application.

Figure 2:
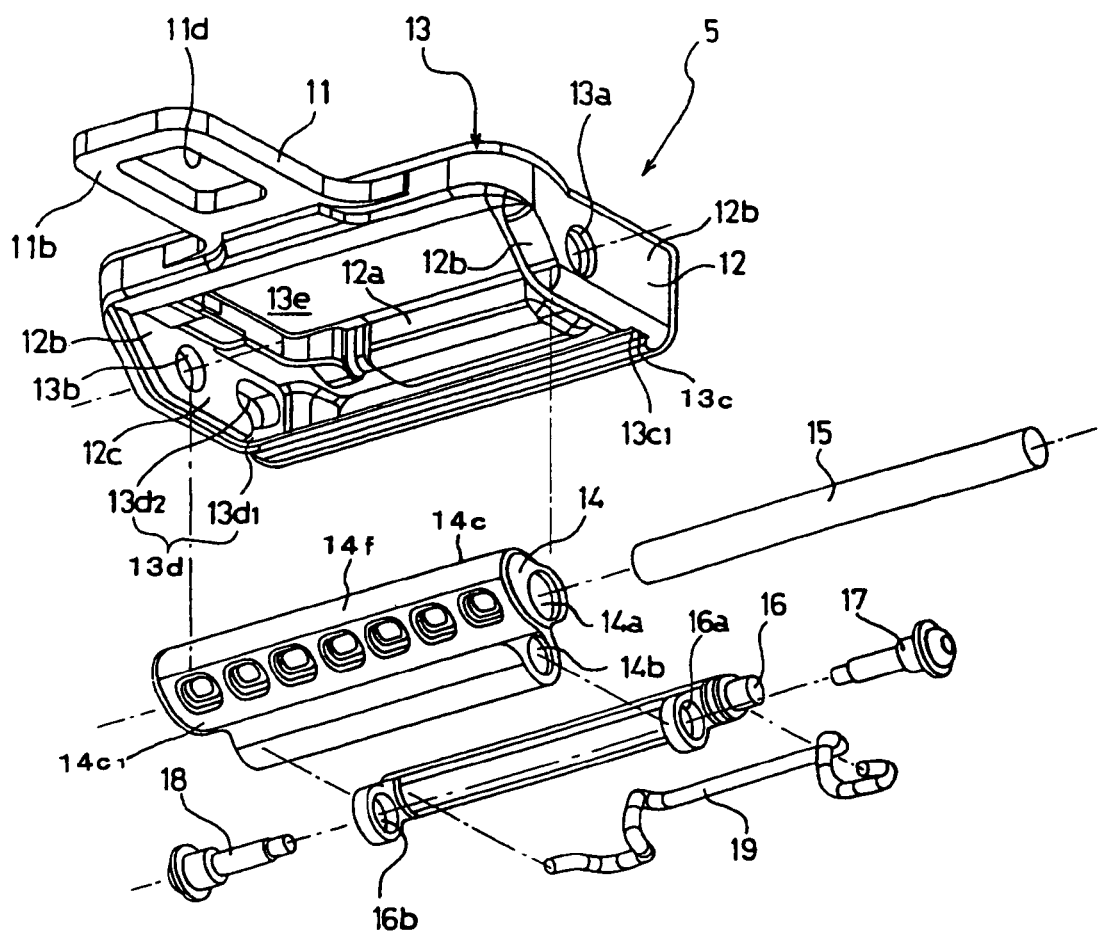
FIG. 2 is an exploded perspective view showing an example of the embodiment of the tongue in the seatbelt apparatus according to one embodiment.

FIG. 2 is an exploded perspective view showing the tongue proposed in Japanese Patent Application No. 2004-375760.

As shown in FIG. 2, the tongue 5 includes a tongue body 13 having a metallic tongue plate 11 and a tongue mold 12 which covers the tongue plate 11 partly with resin, a webbing guide 14 provided on the tongue body 13 so as to be capable of relative rotation, a revolving shaft 15 set across the tongue body 13 by being fitted into a pair of mounting holes 13a, 13b of the tongue body 13 and a through hole 14a of the webbing guide 14 respectively for rotatably supporting the webbing guide 14, a lock bar 16 supported by the webbing guide 14 so as to be capable of relative rotation, a pair of revolving shafts 17, 18 formed of bolts for rotatably supporting the lock bar 16 by being fitted into a through hole 14b of the webbing guide 14 and a pair of mounting holes 16a, 16b of the lock bar 16, and a bar spring 19 mounted respectively to the tongue mold 12 and the lock bar 16 for urging the lock bar 16 constantly in one direction.

Figure 3C:
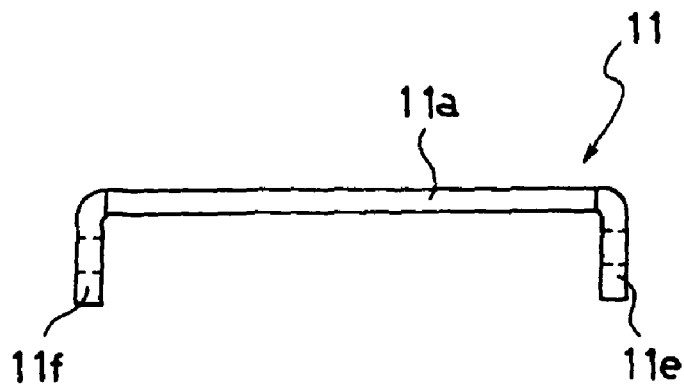
Figures 3A, 3B:
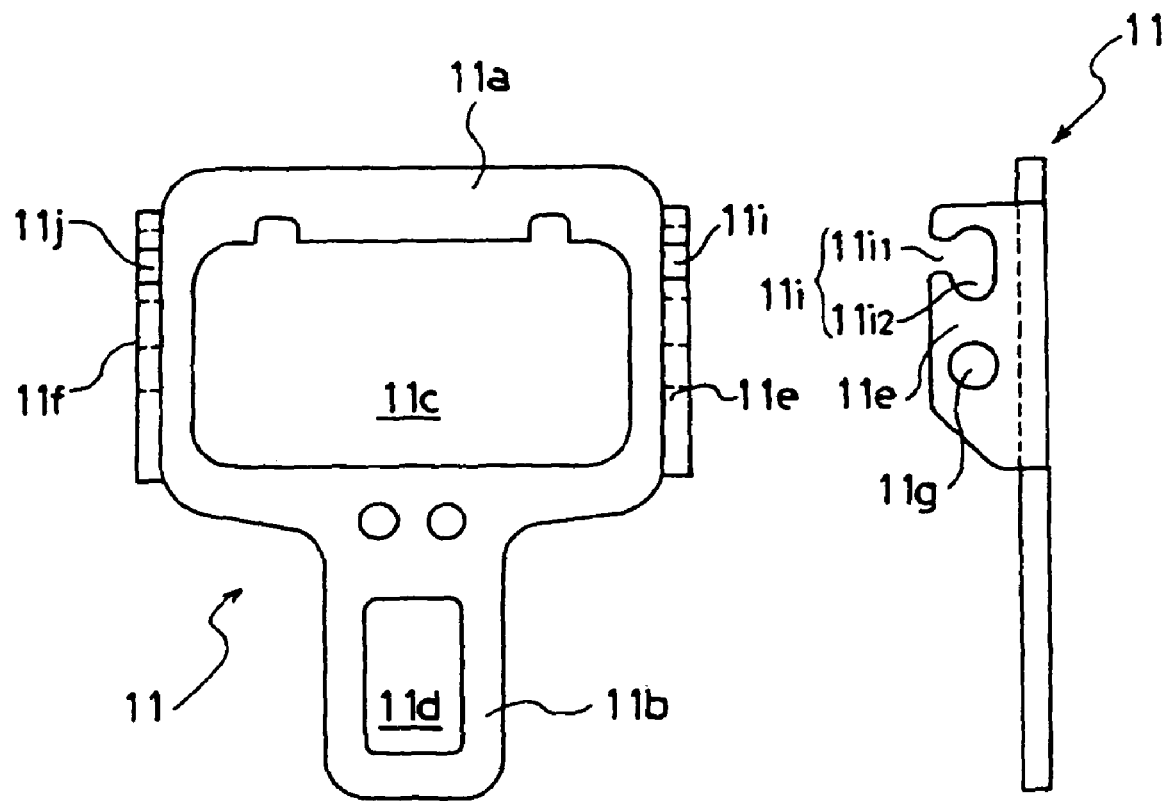

FIGS. 3(a)-3(c) show the tongue plate 11 according to one embodiment of the invention. FIG. 3(a) is a front view, FIG. 3(b) is a right side view, and FIG. 3(c) is a top view.

As shown in FIGS. 3(a) to 3(c), the tongue plate 11 is formed of a substantially T-shaped metallic plate having a laterally extending portion 11a and a vertically extending portion 11b extending integrally and vertically from a center portion of the laterally extending portion 11a. The laterally extending portion 11a is formed with a large square opening 11c extending in the lateral direction, and the vertically extending portion 11b is formed with a square opening 11d extending in the vertical direction. The opening 11d in the vertical direction is adapted so that a latch member of the buckle 6, not shown, engages like general tongues in the related art. Therefore, the vertically extending portion 11b is configured as an engaging strip which engages with the tongue 5. Hereinafter, the vertically extending portion 11b is also referred to as the engaging strip 11b.

A pair of side walls 11e, 11f are provided so as to extend upright at both ends of the laterally extending portion 11a. The side walls 11e, 11f are formed respectively with holes 11g, 11h of the same size. The pair of side walls 11e, 11f are provided respectively with recessed grooves 11i, 11j of the same size. As shown clearly in FIG. 3(b), one of the recessed groove 11i is formed into T-shape with a lateral groove $11i_1$ opening to an outer peripheral edge of the side wall 11e and a vertical groove $11i_2$ in communication with the lateral groove $11i_1$. The other recessed groove 11j has the same shape as the recessed groove 11i, and is formed into the T-shape with a lateral groove $11j_1$ and a vertical groove $11j_2$ (Reference numerals 11h, $11j_1$, $11j_2$ are not shown in the drawing, but correspond to 11g, $11i_1$, $11i_2$ respectively, and are used for convenience of explanation).

As shown in FIG. 2, almost all of the laterally extending portion 11a of the tongue plate 11 is molded with resin, and then the tongue mold 12 is formed. In this case, by molding an inner peripheral surface of the pair of holes 11g, 11h with resin, the above-described pair of mounting holes 13a, 13b for allowing fitting of the revolving shaft 15 are formed. Also, by closing a right end of the recessed groove 11i in FIG. 3(a) and a left end of the recessed groove 11j in FIG. 3(a) with mold resin respectively and molding an inner peripheral surface of the pair of recessed grooves 11i, 11j as shown in FIG. 2, guide grooves 13c, 13d are formed respectively. One of the guide grooves 13d is formed into the T-shape with a vertical groove $13d_1$ opening upward and a lateral groove $13d_2$ communicating with the lateral groove $13d_1$. The other guide groove 13c has the same shape as the guide groove 13d and is formed into the T-shape with a vertical groove $13c_1$ and a lateral groove $13c_2$ communication with the vertical groove $13c_1$. (Reference numeral $13c_2$ is not shown, but corresponds to the reference numeral $13d_2$, and is used for convenience of explanation). Furthermore, by molding an inner peripheral surface of the opening 11c of the tongue plate 11 with resin, a large square opening 13e is formed on the tongue body 13.

Figure 4A:
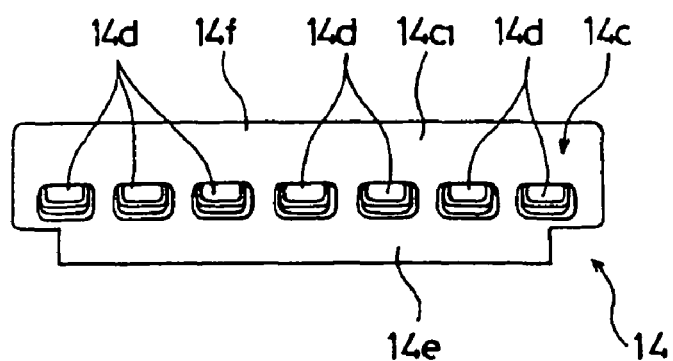
Figure 4C:
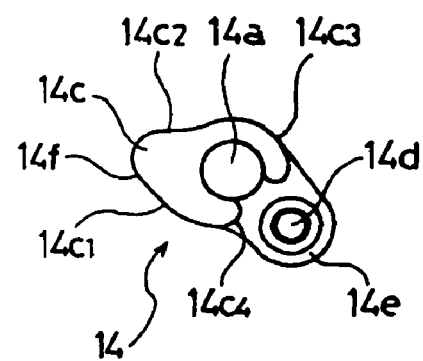
Figure 4B:
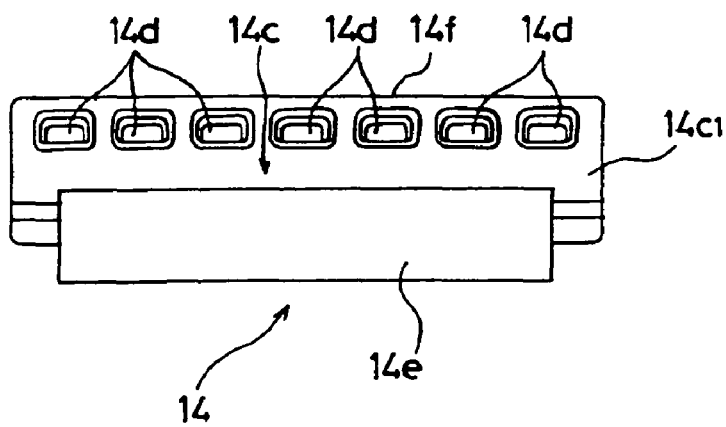

FIGS. 4(a)-4(c) show the webbing guide 14 according to one embodiment of the invention. FIG. 4(a) is a front view, FIG. 4(b) is a right side view, and FIG. 4(c) is a bottom view.

As shown in FIGS. 4(a) to 4(c), the webbing guide 14 is formed into a substantially square shape in lateral cross-section, and is provided with a relatively long guide body 14c having four corners rounded into R portions having a large diameter. Four surfaces $14c_1$, $14c_2$, $14c_3$, and $14c_4$ corresponding to the four sides of the square guide body 14c respectively are formed into curved surfaces which swell slightly outward. At least one side of these four sides may be formed as a linear plate.

On one surface $14c_1$ of the guide body 14c facing downward in FIG. 2 is formed with a predetermined number (seven in the example shown in the drawing) of square shaped recesses 14d. The above-described through hole 14a is provided in the guide body 14c so as to penetrate therethrough in the longitudinal direction. Another surface $14c_4$ of the guide body 14c is formed with a mounting member 14e integrally along the longitudinal direction of the guide body 14c. Then, the above-described through hole 14b is formed on the mounting member 14e so as to penetrate in the longitudinal direction.

A boundary including a corner between the surface $14c_1$ of the guide body 14c and the surface $14c_2$ continuing from the surface $14c_1$ and facing upward corresponds to a webbing guide portion 14f for guiding the seatbelt 4 on the input side of the seatbelt 4. Furthermore, the surface $14c_4$ of the guide body 14c functions as a stopper as described later.

The revolving shaft 15 for rotatably supporting the webbing guide 14 on the tongue body 13 is adapted to function also as a strength retaining member which can support a pulling force of a large magnitude which is applied to the seatbelt 4 in case of emergency.

FIGS. 5(a)-5(c) shows the lock bar 16 according to one embodiment of the invention. FIG. 5(a) is a front view, FIG. 5(b) is a right side view, and FIG. 5(c) is a top view.

As shown in FIGS. 5(a) to 5(c), the lock bar 16 is provided with a lock body 16c of substantially square shape in a lateral cross-section. The lock body 16c is provided at both ends thereof with guide shafts 16d, 16e respectively. The guide shafts 16d, 16e are fitted to the guide grooves 13c, 13d of the tongue body 13 so as to be capable of moving, whereby guiding the lock body 16c. The lock body 16c is integrally provided at both ends thereof with mounting members 16f, 16g having an arched cross section so as to extend upright at a predetermined distance. The distance between the pair of mounting members 16f, 16g are set to a length which allows entry of the mounting member 14e of the webbing guide 14 between the mounting members 16f, 16g. The above-described pair of mounting holes 16a, 16b are formed on the mounting members 16f, 16g, respectively. The lock body 16c is formed at both ends thereof with mounting holes 16h, 16i which are circular in cross-section.

FIGS. 6(a) to 6(d) show the bar spring 19 according to one embodiment of the invention. FIG. 6(a) is a front view, FIG. 6(b) is a right side view, FIG. 6(c) is a top view, and FIG. 6(d) is a perspective view.

As shown in FIGS. 6(a) to 6(d), the bar spring 19 is formed of a resilient wire member, and is formed into a relatively complicated shape in laterally symmetry shown in FIGS. 6(a) and 6(c). In other words, the bar spring 19 includes, in sequence from a right side of a first portion 19a at a center toward a right end, a second portion 19b bent in the vertical direction at a right angle, a third portion 19c bent from the second portion 19b at a right angle with respect to both of the first and second portions 19a, 19b, a fourth portion 19d bent from the third portion 19c toward the second portion 19b so as to extend in parallel with the second portion 19b and at right angle with respect to the third portion 19c, a fifth portion 19e bent from the fourth portion 19d toward an opposite side from the first portion 19a so as to extend in parallel with the first portion 19a and at a right angle with respect to the fourth portion 19d, and a sixth portion 19f bent from the fifth portion 19e toward an opposite side from the first portion 19a at a right angle with respect to the fifth portion 19e. The bar spring 19 also includes, on a left side of the first portion 19a at the center thereof, a second portion 19g, a third portion 19h, a fourth portion 19i, a fifth portion 19j, and a sixth portion 19k corresponding to the respective portions on the right side.

The bar spring 19 is adapted to be mounted in such a manner that the first portion 19a at the center thereof is fitted into and supported by a spring supporting portion 12a which is constituted of a recessed groove of the tongue mold 12 shown in FIG. 2, and left and right sixth portions 19k, 19f thereof are fitted to the mounting holes 16h, 16i of the lock bar 16 respectively.

The tongue 5 of this example in such a structure is assembled, according to one embodiment of the invention, as described below. The mounting member 14e of the webbing guide 14 is positioned between the mounting members 16f, 16g of the lock bar 16, the revolving shafts 17, 18 are fitted into the mounting holes 16a, 16b of the lock bar 16 respectively and the through hole 14b of the webbing guide 14, and the lock bar 16 is mounted to the mounting member 14e on the output side of the webbing guide 14 so as to be capable of relative rotation. The respective sixth portions 19f, 19k of the bar spring 19 are fitted into the mounting holes 16h, 16i of the lock bar 16, and the bar spring 19 is mounted to the lock bar 16.

Figure 7:
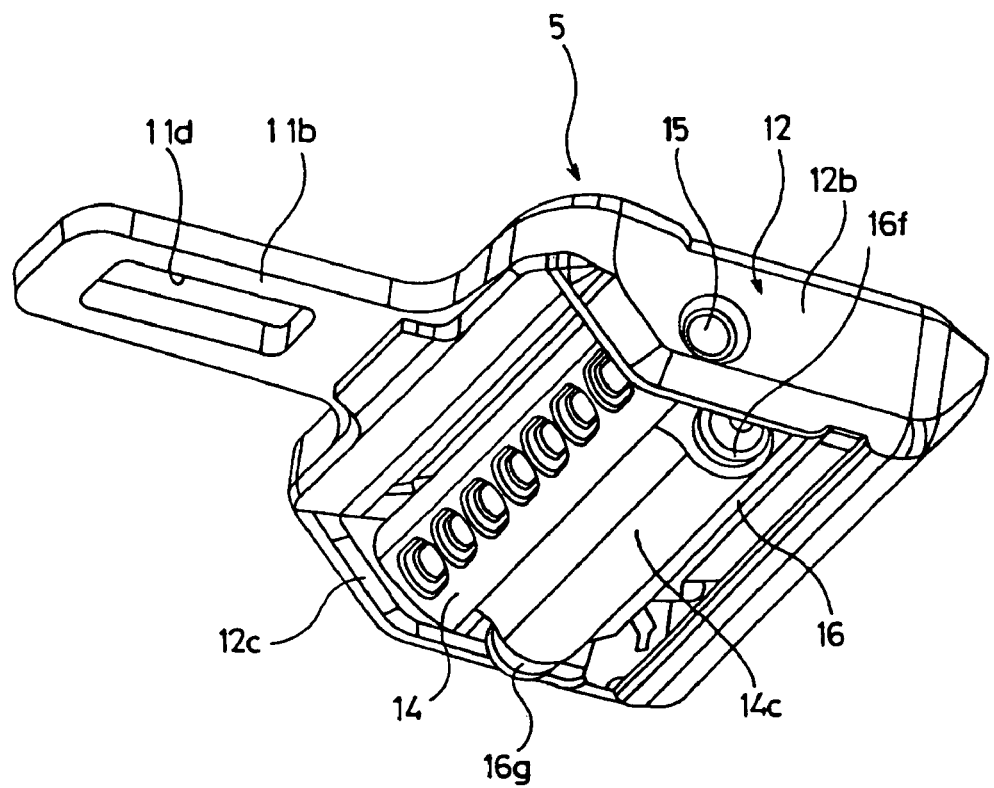
FIG. 7 is a perspective view of the tongue shown in the example in FIG. 2 according to one embodiment.

Then, as shown in FIG. 7, the webbing guide 14 is placed between left and right side walls 12b, 12c of the tongue mold 12 in such a manner that the webbing guide portion 14f faces toward the engaging strip 11b, and the revolving shaft 15 is fitted into the mounting holes 13a, 13b of the tongue body 13 and the through hole 14a of the webbing guide 14, whereby the webbing guide 14 is mounted to the tongue body 13 so as to be capable of relative rotation. Also, the left and right guide shafts 16d, 16e of the lock bar 16 are passed through the vertical grooves $13c_1$, $13d_1$ and then slidably fitted to the lateral groves $13c_2$, $13d_2$ of the guide grooves 13c, 13d, respectively.

Finally, the first portion 19a at the center of the bar spring 19 is fitted to the recessed groove of the spring supporting portion 12a of the tongue mold 12. At this time, the guide shafts 16d, 16e of the lock bar 16 are pressed leftward in FIG. 8(a) by an urging force of the bar spring 19 and moved leftward along the lateral grooves $13c_2$, $13d_2$ of the guide groove 13c, 13d of the tongue mold 12. Simultaneously, since a clockwise moment about the revolving shaft 15 is applied to the webbing guide 14 and the lock bar 16 by the urging force of the bar spring 19, the webbing guide 14 and the lock bar 16 rotate clockwise about the revolving shaft 15. In this case, since the position of the revolving shaft 15 is fixed, the guide shafts 16d, 16e gradually approach the revolving shaft 15. Therefore, as shown in FIG. 8(a), the webbing guide 14 and the lock bar 16 rotate with a bending movement with respect to each other so that the centers of the revolving shafts 17, 18 are located at positions lower than a straight line connecting between the center of the revolving shaft 15 and the centers of the guide shafts 16d, 16e.

Then, the lock bar 16 comes into abutment with a stopper constituted by the one surface $14c_4$ of the webbing guide 14 so that further bending movement with respect to the webbing guide 14 is prevented, and is kept in a state of being bent at substantially a right angle. When the guide shafts 16d, 16e further move leftward and come into contact with one end of each lateral groove $13c_2$, $13d_2$ of the guide grooves 13c, 13d, further leftward movement of the guide shafts 16d, 16e are prevented, whereby the tongue 5 is assembled in a state in which the webbing guide 14 and the lock bar 16 are maintained in initial positions as shown in FIG. 8(a).

Figure 8A:
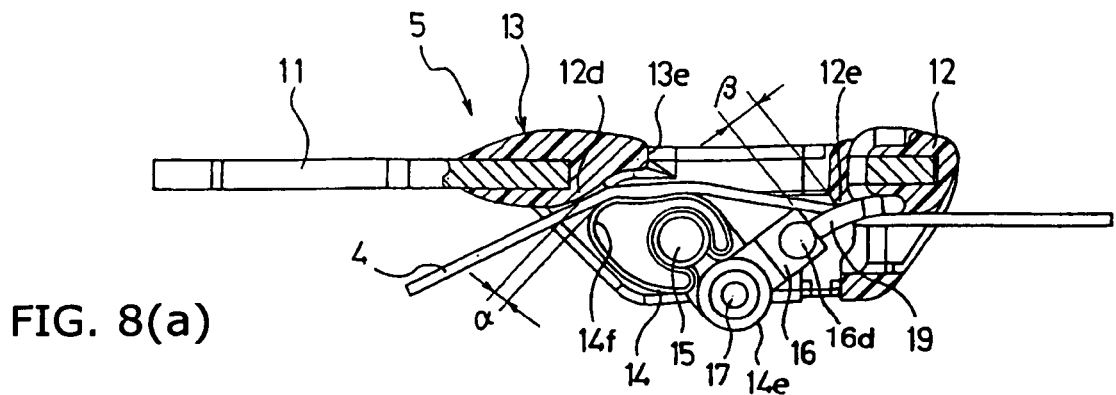
FIGS. 8(a)-8(c) illustrate the operation of the tongue shown in FIG. 2 according to one embodiment of the invention.

In this manner, in a state in which the webbing guide 14 and the lock bar 16 are maintained in the initial positions shown in FIG. 8(a), a gap a is defined between the webbing guide portion 14f of the webbing guide 14 and a portion 12d of the tongue mold 12 opposing to the webbing guide portion 14f, and a gap β is defined between a corner of the lock body 16c of the lock bar 16 and a portion 12e of the tongue mold 12 opposing this corner. These gaps α, β are set to maximum values significantly larger than the thickness of the seatbelt 4 in a state shown in FIG. 8(a). Therefore, when the tongue 5 is supported by the seatbelt 4 so that the seatbelt 4 passes through the gap α and is guided by the webbing guide 14, and then passes through the gap β, the tongue 5 slides with respect to the seatbelt 4 smoothly without little resistance. In addition, since the seatbelt 4 guided by the webbing guide 14 through the opening 13e of the tongue body 13 does not interfere with the tongue mold 12 of the tongue body 13, the tongue 5 slides further smoothly with respect to the seatbelt 4. When the gap α is too large, reversal of the seatbelt 4 may be resulted easily, and hence the gap α is set to an extent that does not cause the reversal of the seatbelt 4.

When a force larger than a predetermined magnitude which causes a counterclockwise moment about the revolving shaft 15 is applied to the webbing guide 14, the webbing guide 14 rotates counterclockwise against the moment generated by the urging force of the bar spring 19. Then, by the rotation of the webbing guide 14, the guide shafts 16d, 16e move linearly along the guide grooves 13c, 13d of the tongue mold 12 while the lock bar 16 rotates clockwise about the guide shafts 16d, 16e. By the clockwise rotation and the linear movement of the lock bar 16, the seatbelt 4 is caught between the corner of the lock body 16c and the portion 12e of the tongue mold 12 and is locked.

In other words, the two pieces of the webbing guide 14 and the lock bar 16 constitute a lap belt extension preventing mechanism for preventing extension of the lap belt 4c by locking the seatbelt 4 in case of emergency. In this case, by the rotation and the linear movement of the lock bar 16, even when the amount of rotation of the lock bar 16 is relatively reduced while increasing the amount of rotation of the webbing guide 14, the sufficient amount of the linear movement of the lock bar 16 is secured.

Subsequently, the operation of the tongue 5 according to one embodiment of the invention will be described. When the seatbelt 4 is not attached as shown in FIG. 8(a), the seatbelt 4 is retracted by the seatbelt retractor 3, not shown, and the tongue 5 assumes a stored state. In the stored state of the tongue 5, the webbing guide 14 and the lock bar 16 are retained in the initial positions shown in FIG. 8(a) by the urging force of the bar spring 19 and the stopper (the first surface $14c_4$ of the guide body 14c) and the both gaps α, β are set to the maximum value as described above. Therefore, the tongue 5 is smoothly slidable with respect to the seatbelt 4.

Figure 8B:
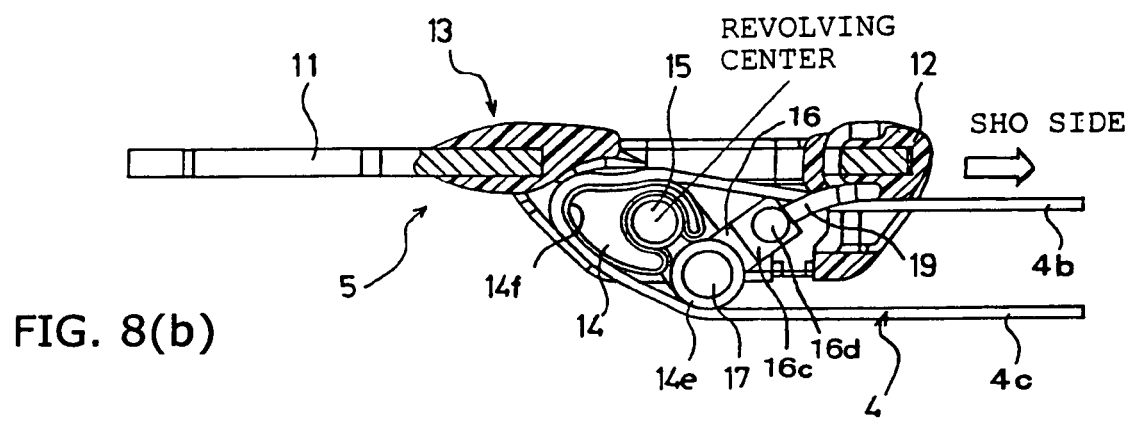

In order to attach the seatbelt 4, the passenger withdraws the tongue 5 from the stored position and inserts the engaging strip 11b of the tongue 5 into the buckle 6 on the opposite side. At this time, since the seatbelt 4 is withdrawn from the seatbelt retractor 3, and the webbing guide 14 and the lock bar 16 do not rotate and are maintained at the initial positions, the tongue 5 slides smoothly with respect to the seatbelt 4. When the passenger engages the tongue 5 with the buckle 6, and then releases the tongue 5, the excessively withdrawn seatbelt 4 is retracted by the seatbelt retractor 3, and hence the seatbelt 4 fits the passenger without giving a feeling of pressure, and the tongue 5 assumes the state shown in FIG. 8(b). In the state shown in FIG. 8(b), since a retracting force of the seatbelt retractor 3 is applied to the seatbelt 4, the seatbelt 4 is maintained in the state of being pulled lightly toward the shoulder (SHO side) of the passenger. Therefore, the webbing guide 14 and the lock bar 16 are maintained in the initial positions. In this state, the seatbelt 4 is in abutment with the webbing guide portion 14f, and is also in abutment with the mounting member 14e of the webbing guide 14.

In case of emergency such as vehicle collision or the like where a significantly large deceleration is applied to a vehicle, when the pretensioner, not shown, provided in the seatbelt retractor 3 is activated, the seatbelt 4 is quickly retracted by the seatbelt retractor 3, and the seatbelt 4 is pulled toward the SHO side further strongly. Therefore, the webbing guide 14 and the lock bar 16 are still maintained in the initial positions.

When the operation of the pretensioner is ended, the seatbelt 4 is pulled toward the lumber of the passenger (LAP side) strongly by a force of inertia toward the front at the lumber (LAP) of the passenger. Since the pulling force of the seatbelt 4 toward the LAP side acts on the webbing guide portion 14$f$ and the mounting member 14$e$ of the webbing guide 14 and a counterclockwise large moment about the revolving shaft 15 is applied to the webbing guide 14, the webbing guide 14 rotates counterclockwise about the revolving shaft 15. Simultaneously, the guide shafts 16$d$, 16$e$ move linearly from one end to the other end (toward the right in FIG. 8($b$)) along the lateral grooves 13$c_2$, 13$d_2$ of the guide grooves 13$c$, 13$d$ of the tongue mold 12 while the lock bar 16 rotates clockwise about the guide shafts 16$d$, 16$e$.

Figure 8C:
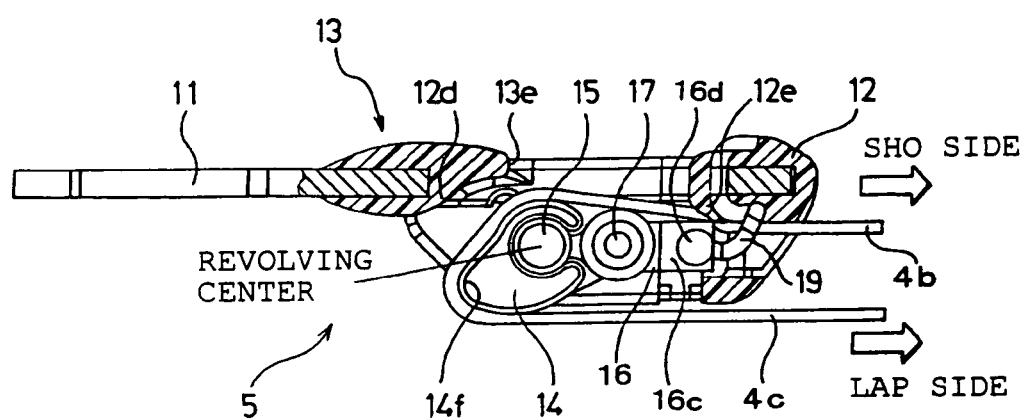

Due to the counterclockwise rotation of the webbing guide 14 and the clockwise rotation and the linear movement of the lock bar 16, the corner of the lock body 16$c$ of the lock bar 16 approaches the portion 12$e$ of the tongue mold 12 and the gap $\beta$ is reduced. Accordingly, as shown in FIG. 8($c$), the seatbelt 4 is caught between the corner of the lock body 16$c$ and the portion 12$e$ of the tongue mold 12. In this case, since the sufficient amount of linear movement is secured even when the amount of rotation is small because of the rotation and the linear movement of the lock bar 16, the significantly large force is generated to catch the seatbelt 4.

In addition, in a state in which the seatbelt 4 is caught between the corner of the lock body 16$c$ and the portion 12$e$ of the tongue mold 12, the centers of the revolving shafts 17, 18 that connect the webbing guide 14 and the lock bar 16 are located at positions slightly upper than the straight line connecting the center of the revolving shaft 15 and the centers of the guide shafts 16$d$, 16$e$. Therefore, the urging force of the bar spring 19 urges the webbing guide 14 and the lock bar 16 about the revolving shaft 15 so as to rotate counterclockwise. In other words, the force to catch the seatbelt 4 by the corner of the lock body 16$c$ and the portion 12$e$ of the tongue mold 12 is increased to a further large force by the pulling force of the seatbelt 4 toward the LAP side and the urging force of the bar spring 19. Therefore, the seatbelt 4 is firmly caught by the corner of the lock body 16$c$ and the portion 12$e$ of the tongue mold 12 and hence locking of the seatbelt 4 by the lock bar 16 is reliably achieved. Therefore, sliding movement of the seatbelt 4 between the corner of the lock body 16$c$ and the portion 12$e$ of the tongue mold 12, and hence extension of the seatbelt 4 is prevented, whereby constraint of the passenger by the seatbelt 4 is ensured.

Figure 9:
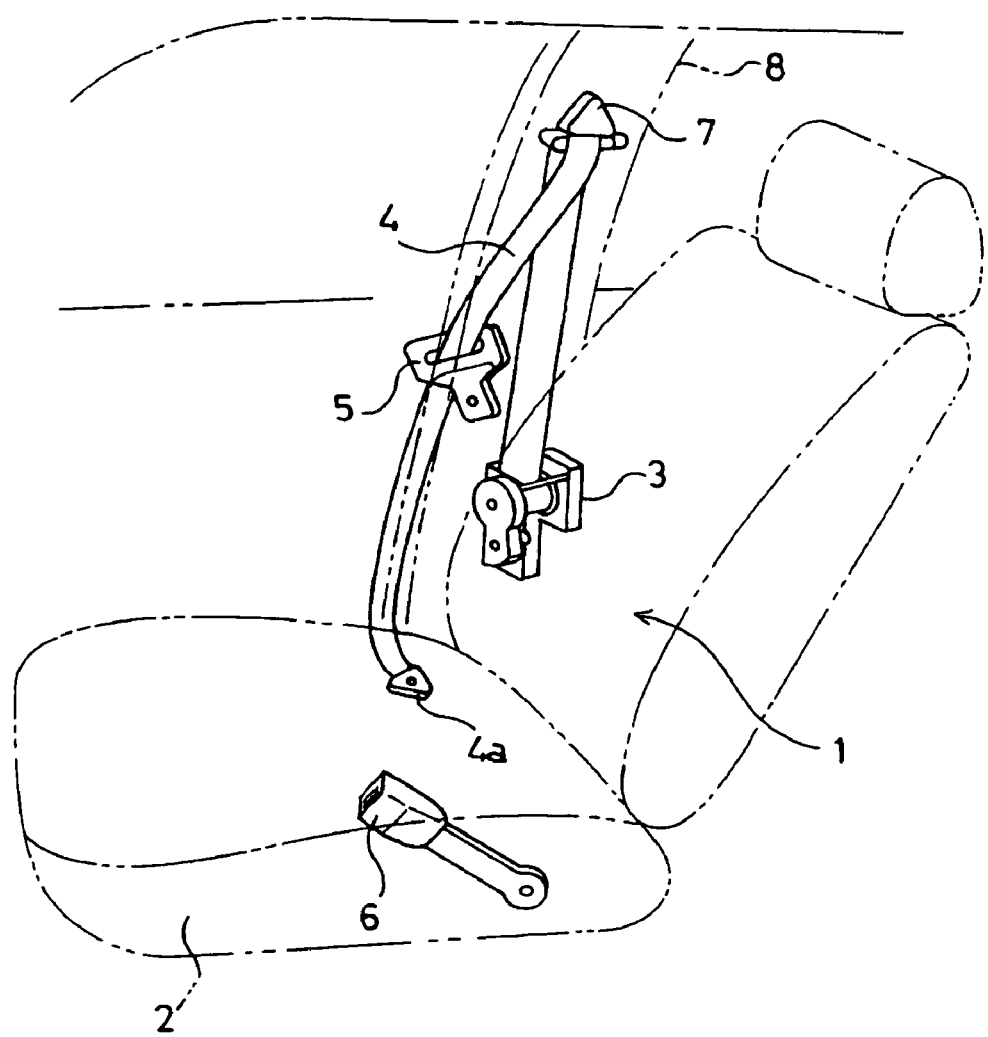
FIG. 9 is a perspective view showing a general three-point type seatbelt apparatus in the related art schematically.
Figure 10B:
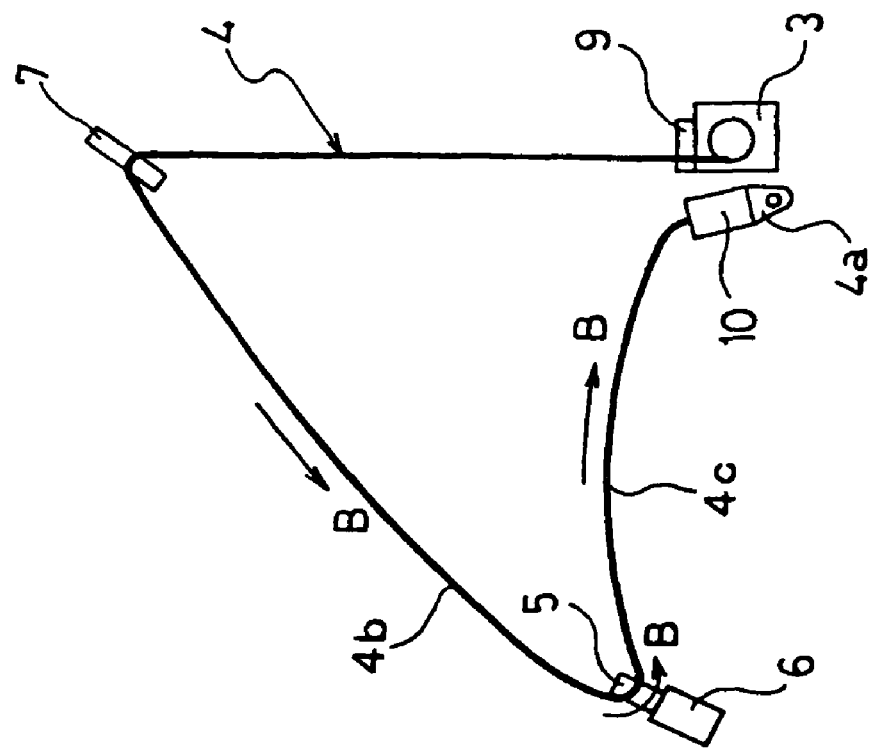
Figure 10A:
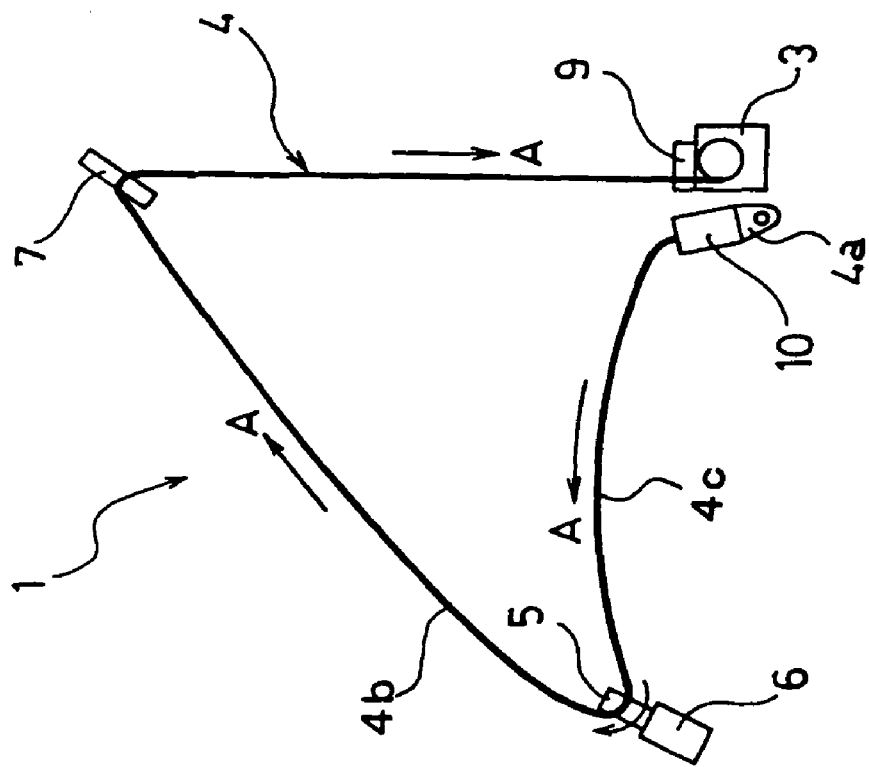

Other structures and other operations of the seatbelt apparatus 1 according to one embodiment of the invention are the same as the example shown in FIG. 9 and FIG. 10 described above.

In the seatbelt apparatus 1 according to one embodiment of the invention, when a first pretensioner 9 of the seatbelt retractor 3 is activated and the seatbelt 4 is retracted by the seatbelt retractor 3, both of the shoulder belt 4$b$ and the lap belt 4$c$ are pulled toward the seatbelt retractor 3 as shown by an arrow in FIG. 1($a$). Then, a second pretensioner 10 of the belt anchor portion 4$a$ is activated, and the seatbelt 4 is pulled toward the belt anchor portion 4$a$ as shown in FIG. 1($b$). At this time, since the tongue 5 is constructed as the above-described one-way tongue, when the second pretensioner 10 is activated in a state in which both of the shoulder belt 4$b$ and the lap belt 4$c$ are pulled toward the seatbelt retractor 3 by a predetermined pulling force by the operation of the first pretensioner 9, and hence the lap belt 4$c$ is pulled toward the belt anchor portion 4$a$ by a pulling force larger than the predetermined pulling force as shown by an arrow B, the tongue 5 catches and locks the seatbelt 4. Accordingly, when the lap belt 4$c$ is pulled toward the belt anchor portion 4$a$, the shoulder belt 4$b$ does not move toward the lap belt 4$c$ through the tongue 5. Therefore, removal of a slack of the lap belt 4$c$ is ensured, and hence the lumber of the passenger is securely constrained.

According to the seatbelt apparatus 1 according to one embodiment of the invention, when the two pretensioners are activated under two time frames in such a manner that the pretensioner 9 of the seatbelt retractor 3 is activated first and then the pretensioner 10 of the belt anchor portion 4$a$ is activated, the tongue 5 prevents the shoulder belt 4$b$ from moving toward the lap belt 4$c$, removal of the slack of the lap belt 4$c$ is ensured. Accordingly, the lumber of the passenger by the lap belt 4$c$ can be constrained firmly, and hence the effects of constraining the passenger can be sufficiently achieved.

Since the tongue 5 which is composed of the one-way tongue is used as the belt one-way movement preventing mechanism, it is not necessary to provide specific parts as the belt one-way movement preventing mechanism, and hence the number of parts can be reduced, and the structure can be simplified and, in addition, the seatbelt apparatus 1 can be manufactured at a low cost.

In the example described above, the two pretensioners 9, 10 are provided in the seatbelt retractor 3 and the belt anchor portion 4$a$. However, in the present invention, the two pretensioners 9, 10 can be provided in any two of the seatbelt retractor 3, the belt anchor portion 4$a$, and the buckle 6. In this case, if there is a probability that the shoulder belt 4$b$ moves toward the lap belt 4$c$ when the second pretensioner is activated, the movement of the shoulder belt 4$b$ toward the lap belt 4$c$ can be prevented by the belt one-way movement preventing mechanism. Even when there is a probability that the lap belt 4$c$ moves toward the shoulder belt 4$b$ when the second pretensioner is activated, since it is the direction to remove the slack of the lap belt 4$c$, the belt one-way movement preventing mechanism can be adapted so as not to prevent the movement of the lap belt 4$c$ toward the shoulder belt 4$b$.

Although the tongue in the above-described Japanese Patent Application No. 2004-375760 is used as the one-way tongue which constitutes the tongue 5, it is not limited thereto, and other types of one-way tongue can be used as long as it prevents the movement of the shoulder belt 4$b$ toward the lap belt 4$c$ through the tongue 5 when the pretensioner of the second step is activated and hence the lap belt 4$c$ is pulled. It is also possible to constitute the belt one-way movement preventing mechanism with a suitable structure other than the tongue.

Several advantages are realized from the above-described invention. The tongue of the present invention used for the seatbelt apparatus mounted in the vehicle such as the automotive vehicle for constraining and protecting the passenger by the seatbelt, and can be suitably used as the tongue which is slidably supported by the seatbelt and engages with the buckle.

According to one embodiment, in the seatbelt apparatus of the present invention, when there is a probability that the shoulder belt moves toward the lap belt when the second pretensioner is activated subsequently, the belt one-way movement preventing mechanism prevents the shoulder belt from moving toward the lap belt. Therefore, removal of the slack of the lap belt is ensured. Accordingly, the lumber of the passenger can be firmly constrained by the lap belt, and the effects of constraining the passenger are satisfactorily achieved.

In particular, according to another embodiment of the invention, since the one-way tongue is used as the belt one-way movement preventing mechanism, it is not necessary to provide specific parts as the belt one-way movement preventing mechanism, and hence the number of parts can be reduced, and the structure can be simplified. In addition, the seatbelt apparatus can be manufactured at a lower cost.

Priority Application 2005-110462, filed Apr. 7, 2005 including the specification, drawings, claims and abstract, is incorporated herein by reference in its entirety.

The foregoing description of a preferred embodiment of the invention has been presented for purposes of illustration and description. It is not intended to be exhaustive or to limit the invention to the precise form disclosed, and modifications and variations are possible in light of the above teaching or may be acquired from practice of the invention. The embodiment was chosen and described in order to explain the principles of the invention and as a practical application to enable one skilled in the art to utilize the invention in various embodiments and with various modification are suited to the particular use contemplated. It is intended that the scope of the invention be defined by the claims appended hereto and their equivalents.

What is claimed is:

1. A method for operating a seatbelt apparatus to restrain a vehicle occupant, wherein the seatbelt apparatus includes a seatbelt including a shoulder belt and a lap belt that is disposed in a seatbelt retractor, the method comprising the steps of:
    activating a first pretensioner at a first time and activating a second pretensioner at a second time, wherein each may be provided in at least two devices selected from the seatbelt retractor, a belt anchor portion and a buckle, wherein the first and second pretensioners are activated to pull the seatbelt in case of emergency; and
    activating a belt one-way movement preventing mechanism to prevent the shoulder belt from moving toward the lap belt when the second pretensioner is activated.

2. A method for operating a seatbelt apparatus to restrain a vehicle occupant as claimed in claim 1, wherein the first and second pretensioners are adapted to be activated under two time frames in such a manner that the second pretensioner is activated after having activated the first pretensioner.

3. A method for operating a seatbelt apparatus to restrain a vehicle occupant as claimed in claim 1, wherein when a predetermined pulling force toward the shoulder belt is applied to the seatbelt and, in this state, a force larger than the predetermined pulling force is applied to the seatbelt in the direction toward the lap belt, the method further comprising the steps of:
    preventing the shoulder belt from moving toward the lap belt; and
    allowing the lap belt to move toward the shoulder belt.

4. A method for operating a seatbelt apparatus to restrain a vehicle occupant as claimed in claim 1, wherein the seat belt apparatus further comprises:
    a plate covered by a mold;
    a webbing guide for preventing webbing from moving in a direction when a predetermined force is applied to the seatbelt, the webbing guide including a lock bar configured so that the webbing is secured between the lock bar and the mold when the force is applied;
    a revolving shaft set across a tongue body;
    a through hole for rotatably supporting the webbing guide;
    the lock bar supported by the webbing guide so as to be capable of relative rotation;
    a pair of guide shafts for rotatably supporting the lock bar; and
    a bar spring mounted to the mold and the lock bar for urging the lock bar constantly in one direction, the method further comprising the steps of:
    rotating the webbing guide counterclockwise against a moment generated by a urging force of the bar spring when a force larger than a predetermined magnitude is applied to the webbing guide;
    moving the pair of guide shafts linearly along a plurality of guide grooves of the mold while the lock bar rotates clockwise about the pair of guide shafts; and
    catching and locking the seatbelt between a corner of the lock body and the portion of the mold.

* * * * *